US007985139B2

(12) United States Patent
Lind et al.

(10) Patent No.: US 7,985,139 B2
(45) Date of Patent: Jul. 26, 2011

(54) GAMING MACHINE CABINET WITH VERTICALLY OPERATING DOORS

(75) Inventors: Jefferson C. Lind, Austin, TX (US); Matthew H. Haga, Austin, TX (US); Frank C. DeSimone, Henderson, NV (US); Leroy H. Gutknecht, Las Vegas, NV (US)

(73) Assignee: Multimedia Games, Inc., Austin, TX (US)

( * ) Notice: Subject to any disclaimer, the term of this patent is extended or adjusted under 35 U.S.C. 154(b) by 923 days.

(21) Appl. No.: 11/939,905

(22) Filed: Nov. 14, 2007

(65) Prior Publication Data

US 2008/0119289 A1 May 22, 2008

Related U.S. Application Data

(60) Provisional application No. 60/865,841, filed on Nov. 14, 2006.

(51) Int. Cl.
*G06F 17/00* (2006.01)

(52) U.S. Cl. ........................................................ 463/46

(58) Field of Classification Search .................... 463/46, 463/16–25

See application file for complete search history.

(56) References Cited

U.S. PATENT DOCUMENTS

| | | | | |
|---|---|---|---|---|
| 267,654 | A | * | 11/1882 | Ross |
| 557,095 | A | * | 3/1896 | Tate |
| 1,471,757 | A | * | 10/1923 | Thiriot |
| 1,692,064 | A | * | 11/1928 | Trogner |
| 3,401,992 | A | * | 9/1968 | Benson et al. |
| 4,861,121 | A | * | 8/1989 | Gotz |
| 4,881,744 | A | * | 11/1989 | Hansen |
| D306,464 | S | | 3/1990 | Axtell |
| 5,013,104 | A | * | 5/1991 | Knoppel et al. |
| 5,061,023 | A | * | 10/1991 | Soubliere et al. |
| 5,090,785 | A | * | 2/1992 | Stamp |
| 5,276,524 | A | | 1/1994 | Inoue et al. |
| 5,813,914 | A | * | 9/1998 | McKay et al. |
| 6,005,641 | A | * | 12/1999 | Ui |
| 6,042,115 | A | | 3/2000 | Ward |
| 6,161,805 | A | | 12/2000 | Wells |

(Continued)

OTHER PUBLICATIONS

International Search Report for PCT/US2007/084666 dated May 2, 2008 (3 Pages).

(Continued)

*Primary Examiner* — Ronald Laneau

(74) *Attorney, Agent, or Firm* — Russell D. Culbertson; The Culbertson Group, P.C.

(57) ABSTRACT

A gaming machine includes a cabinet defining an enclosure volume with a cabinet front opening. A main door is pivotally connected at its upper end to the cabinet so as to be pivotable with respect to the cabinet between a closed position and an open position. In the open position the lower end of the main door is pivoted upwardly and away from the cabinet to expose the enclosure volume in the main portion of the cabinet. A button panel or button panel and armrest structure is mounted at the lower end of the main door, and extends in a plane lying at an angle to the remainder of the main door so as to project outwardly from the cabinet when the main door is in the closed position. A lower door of the gaming machine has a lower end which is ako pivotally connected to the cabinet so as to be pivotable with respect to the cabinet between a closed position and an open position.

13 Claims, 4 Drawing Sheets

U.S. PATENT DOCUMENTS

| | | | | |
|---|---|---|---|---|
| 6,201,532 | B1 * | 3/2001 | Tode et al. | |
| 6,201,703 | B1 * | 3/2001 | Yamada et al. | |
| D451,153 | S | 11/2001 | Hedrick et al. | |
| 6,446,920 | B1 | 9/2002 | Wells et al. | |
| 6,474,758 | B1 * | 11/2002 | Hedrick et al. | |
| D467,284 | S * | 12/2002 | Yamanaka | |
| D468,364 | S * | 1/2003 | Beadell et al. | |
| 6,688,984 | B2 * | 2/2004 | Cole | |
| 6,860,814 | B2 | 3/2005 | Cole | |
| 6,886,896 | B2 | 5/2005 | Hedrick et al. | |
| D508,268 | S * | 8/2005 | Hanchar et al. | |
| 6,958,015 | B2 | 10/2005 | Luciano, Jr. et al. | |
| 6,962,528 | B2 | 11/2005 | Yokota | |
| 6,976,919 | B2 | 12/2005 | Cole | |
| 6,997,810 | B2 | 2/2006 | Cole | |
| 7,267,613 | B2 * | 9/2007 | Cole | 463/20 |
| 7,513,830 | B2 * | 4/2009 | Hajder et al. | 463/46 |
| 2002/0041069 | A1 | 4/2002 | Steelman | |
| 2003/0119574 | A1 | 6/2003 | Yang | |
| 2004/0192444 | A1 | 9/2004 | Morrison | |
| 2005/0085302 | A1 | 4/2005 | Nicastro et al. | |
| 2005/0176509 | A1 | 8/2005 | Hirato | |
| 2005/0277477 | A1 | 12/2005 | Hajder et al. | |
| 2006/0003845 | A1 | 1/2006 | Hessie, Sr. | |
| 2006/0073900 | A1 | 4/2006 | Cole | |
| 2006/0199648 | A1 | 9/2006 | Mitchell et al. | |
| 2008/0113708 | A1 * | 5/2008 | Beadell et al. | 463/16 |
| 2008/0113709 | A1 * | 5/2008 | Beadell et al. | 463/16 |
| 2008/0113715 | A1 * | 5/2008 | Beadell et al. | 463/17 |
| 2008/0113716 | A1 * | 5/2008 | Beadell et al. | 463/17 |
| 2008/0113741 | A1 * | 5/2008 | Beadell et al. | 463/20 |
| 2008/0113796 | A1 * | 5/2008 | Beadell et al. | 463/35 |
| 2008/0113818 | A1 * | 5/2008 | Beadell et al. | 463/46 |
| 2008/0113821 | A1 * | 5/2008 | Beadell et al. | 463/46 |

OTHER PUBLICATIONS

Written Opinion of the International Search Authority (PCT Rule 43bis. 1) for PCT/US2007/084666 dated May 2, 2008 (6 Pages).

Photographs of Gaming Machine Cabinet, G2E Trade Show, Las Vegas, Nevada (2005), 3 pages.

* cited by examiner

GAMING MACHINE CABINET WITH VERTICALLY OPERATING DOORS

CROSS-REFERENCE TO RELATED APPLICATION

The Applicants claim the benefit, under 35 U.S.C. §119(e), of U.S. Provisional Patent Application Ser. No. 60/865,841 filed Nov. 14, 2006, and entitled "Gaming Machine Cabinet With Vertically Operating Doors." The entire content of this provisional patent application is incorporated herein by this reference.

TECHNICAL FIELD OF THE INVENTION

This invention relates to gaming machines used to present results in wagering games and other games. More particularly, the invention relates to a gaming machine that is adapted to accommodate closer spacing with adjacent gaming machines of the same type.

BACKGROUND OF THE INVENTION

Numerous different styles of gaming machines have been developed for use in various gaming environments and applications. These different styles of gaming machines include stand-alone upright gaming machines, pedestal-mounted gaming machines, and slant-top gaming machines, for example. All of these different styles of gaming machines generally include a cabinet that defines an enclosure volume for housing mechanical and electrical components of the gaming machine. Doors are typically included at the front of the gaming machine cabinet. The gaming machine cabinet doors must be able to securely close the gaming machine cabinet in order to secure the inner components and prevent tampering or theft. However, the doors must provide good access to the enclosure volume to facilitate maintenance.

SUMMARY OF THE INVENTION

A gaming machine according to the present invention includes a front door arrangement in which the entire front opening of the cabinet may be exposed without interfering with adjacent gaming machines. A front door arrangement according to the invention allows wide-body pedestal-mounted gaming machines to be arranged very closely together on standard width pedestals.

In the following description of the present invention and in the claims, certain structural features may be described with reference to vertical or horizontal lines. Also, certain features may be described with the terms "upper" and "lower," "above" and "below," and other terms that indicate a relative position. In all of these descriptions the terms indicating position or relative position are used with reference to the gaming machine in the orientation shown in the figures described below.

A gaming machine according to the present invention includes a cabinet having a cabinet back, a first cabinet side, a second cabinet side, a cabinet bottom, and a cabinet top which together define an enclosure volume with a cabinet front opening. A main door is pivotally connected at its upper end to the cabinet so as to be pivotable with respect to the cabinet between a closed position and an open position. In the closed position the main door covers the cabinet front opening in a main portion of the cabinet to define a front side of the main portion of the cabinet. In the open position the lower end of the main door is pivoted upwardly and away from the cabinet to expose the enclosure volume in the main portion of the cabinet. A button panel structure is mounted at the lower end of the main door, and extends in a plane lying at an angle to the remainder of the main door so as to project outwardly from the cabinet when the main door is in the closed position. A lower door of the gaming machine is also pivotally connected to the cabinet so as to be pivotable with respect to the cabinet between a closed position and an open position. However, the connection for the lower door is at its lower end so that in the open position the upper end of the lower door is pivoted downwardly and away from the cabinet and main door to expose the enclosure volume in a lower portion of the cabinet. In the closed position the lower door covers the cabinet front opening in the lower portion of the cabinet to define a front side of the lower portion of the cabinet. The upper and lower doors are arranged such that when they are each in their respective closed position the two doors meet along a closure line which extends across the width of the cabinet between the first cabinet side and second cabinet side. The closure line is located immediately below the outwardly projecting button panel structure when the gaming machine is in an operating position.

In some preferred forms of a gaming machine according to the present invention, a lower portion height dimension between the cabinet bottom and a base of the button panel is approximately 65% of a main portion height dimension between the upper edge of the main door and the base of the button panel. Also, the button panel and armrest structure projects outwardly from the remainder of the main door a distance that is approximately 38% of an overall depth dimension of the gaming machine and the overall depth dimension may be approximately 75% of a gaming machine width dimension.

The main portion height dimension may be approximately 83% to approximately 88% of a gaming machine width dimension and the lower portion height dimension may be approximately 54% to approximately 58% of the gaming machine width dimension.

These and other advantages and features of the invention will be apparent from the following description of preferred embodiments, considered along with the accompanying drawings.

DESCRIPTION OF PREFERRED EMBODIMENTS

Figure 1:
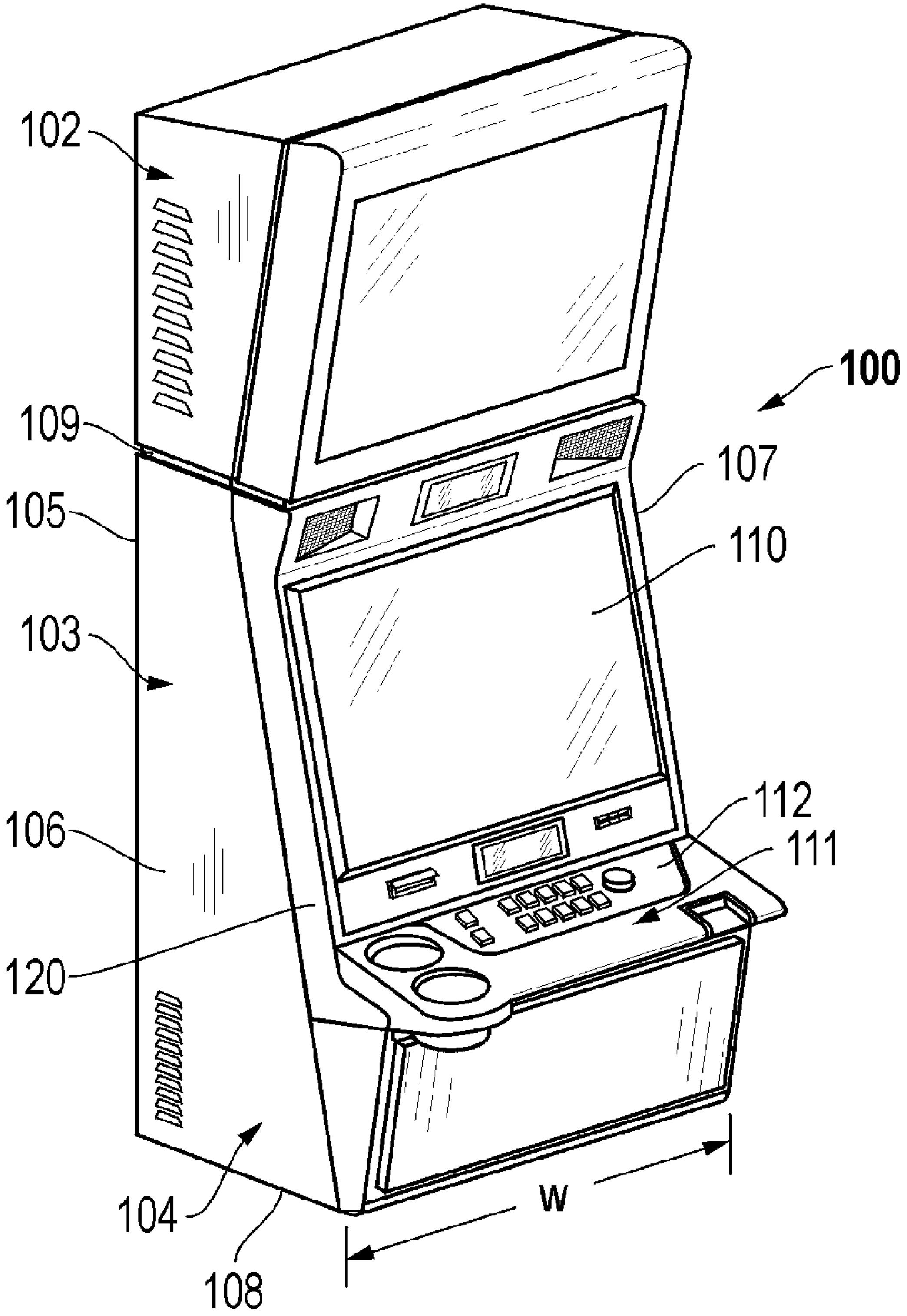
FIG. 1 is a perspective view of a gaming machine embodying the principles of the present invention.

A gaming machine 100 which is adapted to be placed on a pedestal for operation includes a top box portion 102, a main portion 103, and a lower portion 104. Top box portion 102 is preferably a separate box that is readily detachable from main portion 103. Main portion 103 and lower portion 104 thus represent a cabinet having a cabinet back 105, first cabinet side 106, second cabinet side 107, cabinet bottom 108, and cabinet top 109 which together define an enclosure volume with a cabinet front opening (the cabinet front opening shown covered by doors 120 and 125 in FIG. 1).

Figure 2:
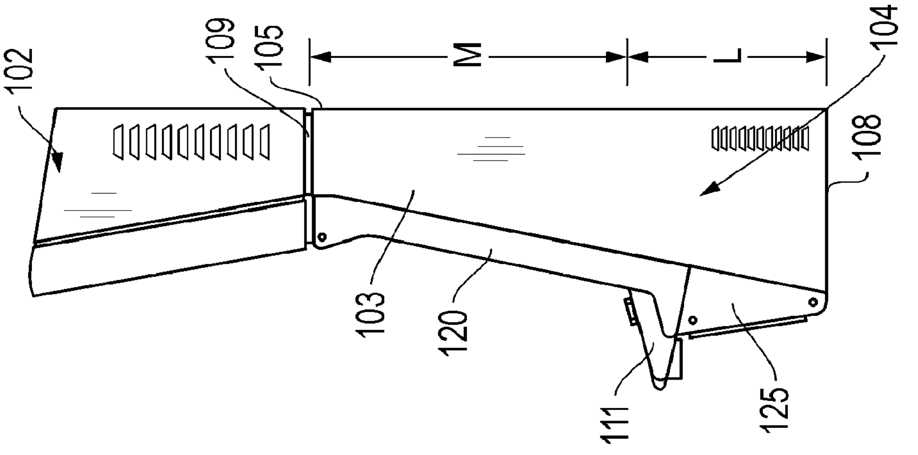
FIG. 2 is a right side view of the gaming machine shown in FIG. 1.

Main portion 103 and lower portion 104 of gaming machine 100 combined are approximately 38 inches in height (height dimension M plus height dimension L in FIG. 2). The height M of main portion 103 is approximately 23 inches, and the height L of lower portion 104 is approximately 15 inches. Thus lower portion height dimension L is approximately 65% of the main portion height dimension M. Gaming machine 100 is approximately 26 inches to 27¾" wide (width dimension W in FIG. 1) and is intended to be operated on a pedestal that is approximately 28 inches wide. When gaming machine 100 is operated on a 15 inch high pedestal, the gaming machine plays similarly to a slant-top gaming machine, while taking much less space than a slant-top gaming machine. When gaming machine 100 is operated on a 20 inch high pedestal, the gaming machine gives the player the feel of a traditional upright gaming machine.

It is noted that traditional upright gaming machines are housed in cabinets that are approximately 19 to 21⅜ inches wide. Pedestal-mounted versions of traditional upright gaming machines are typically operated on pedestals approximately 28 inches wide. This 28 inch wide pedestal may be considered a standard width pedestal.

Gaming machine 100 includes a main display area 110 located above a button panel structure 111, which in this case incorporates an armrest. Display area 110 may contain a video monitor or may contain static glass in front of mechanical reels housed within the gaming machine main portion 103. The plane of display area 110 is inclined rearwardly no more than approximately 15° with respect to vertical. Button panel and armrest structure 111 extends at least approximately 8 inches past the point at which the button panel portion 112 intersects with the plane of display area 110. The overall depth dimension of gaming machine 100 between the front most part of button panel and armrest structure 111 and back 105 of the gaming machine is approximately 21 inches. Thus the button panel and armrest structure 111 projects outwardly from the remainder of main door 120 a distance that is approximately 38% of the overall depth dimension of gaming machine 100 comprising the shortest distance from cabinet back 105 to a front edge of the button panel and armrest structure.

According to the above-described dimensions the overall gaming machine depth dimension is approximately 75% of a gaming machine width dimension W. The main portion height dimension M is approximately 83% to approximately 88% of a gaming machine width dimension W, the lower portion height dimension L is approximately 54% to approximately 58% of a gaming machine width dimension W.

Gaming facilities offering gaming machines such as reel-type games and video poker games typically arrange the gaming machines in a number of sets of gaming machine locations. For pedestal-mounted gaming machines, the gaming machine locations include a number of side -by-side pedestal locations having a common pedestal location width, typically about 28 inches as described above. Gaming machine 100 can be used to replace some or all of the standard narrower gaming machines without changing any of the standard 28 inch wide pedestals on which the typical narrow gaming machines are mounted. Thus a gaming floor arrangement may include a number of standard or first gaming machines and also a number of second gaming machines such as gaming machine 100. Each of the gaming machines is supported at a respective one of the pedestal locations. However, the first gaming machines have a width that is six or more inches narrower that the respective pedestal location. While gaming machine 100 according to the invention may be less than two inches narrower than the pedestal location at which the gaming machine is supported.

The present invention includes a method of arranging pedestal-mounted gaming machines in a gaming establishment having at least one set of side-by-side pedestal locations each having a common pedestal location width. The method includes removing one or more of the narrower first gaming machine cabinets from its respective pedestal location. Each removed gaming machine is replaced with a wider second gaming machine such as gaming machine 100 having a width that is only slightly (less than two inches) less than the respective pedestal location width.

Figure 3:
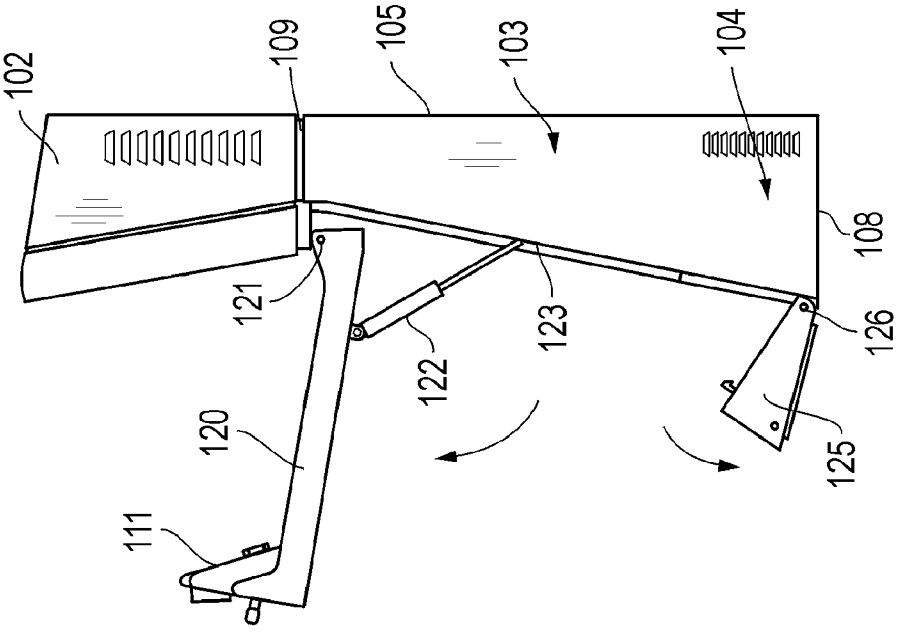
FIG. 3 is a right side view similar to FIG. 2 but showing a main door and lower door pivoted to their respective open position.

As shown best in FIGS. 2 and 3, gaming machine 100 includes main door 120 that pivots upwardly about a pivot axis 121. One or more pneumatic or hydraulic shocks 122 connect between main door 120 and the remainder of the cabinet making up gaming machine 100 to help hold the main door in the open position (or some intermediate position short of the fully open position) as desired, and prevent the main door from falling abruptly to the closed position shown in FIGS. 1 and 2. It will be noted that main door 120 encompasses not only the main display area 110 (FIG. 1) but also the button panel and armrest structure 111. However, the video monitor or other display device used to produce the display in main display area 110 is preferably not mounted on main door 120 and does not raise with the door when the door is opened. Rather the display device that produces the display in main display area 110 is preferably mounted within the enclosure volume of the cabinet.

Gaming machine 100 also includes lower door 125 that pivots downwardly about pivot axis 126 to open. As will be described further below, doors 120 and 125 are configured so that a single latching mechanism associated with lower door 125 holds both doors in the closed position.

Figure 4:
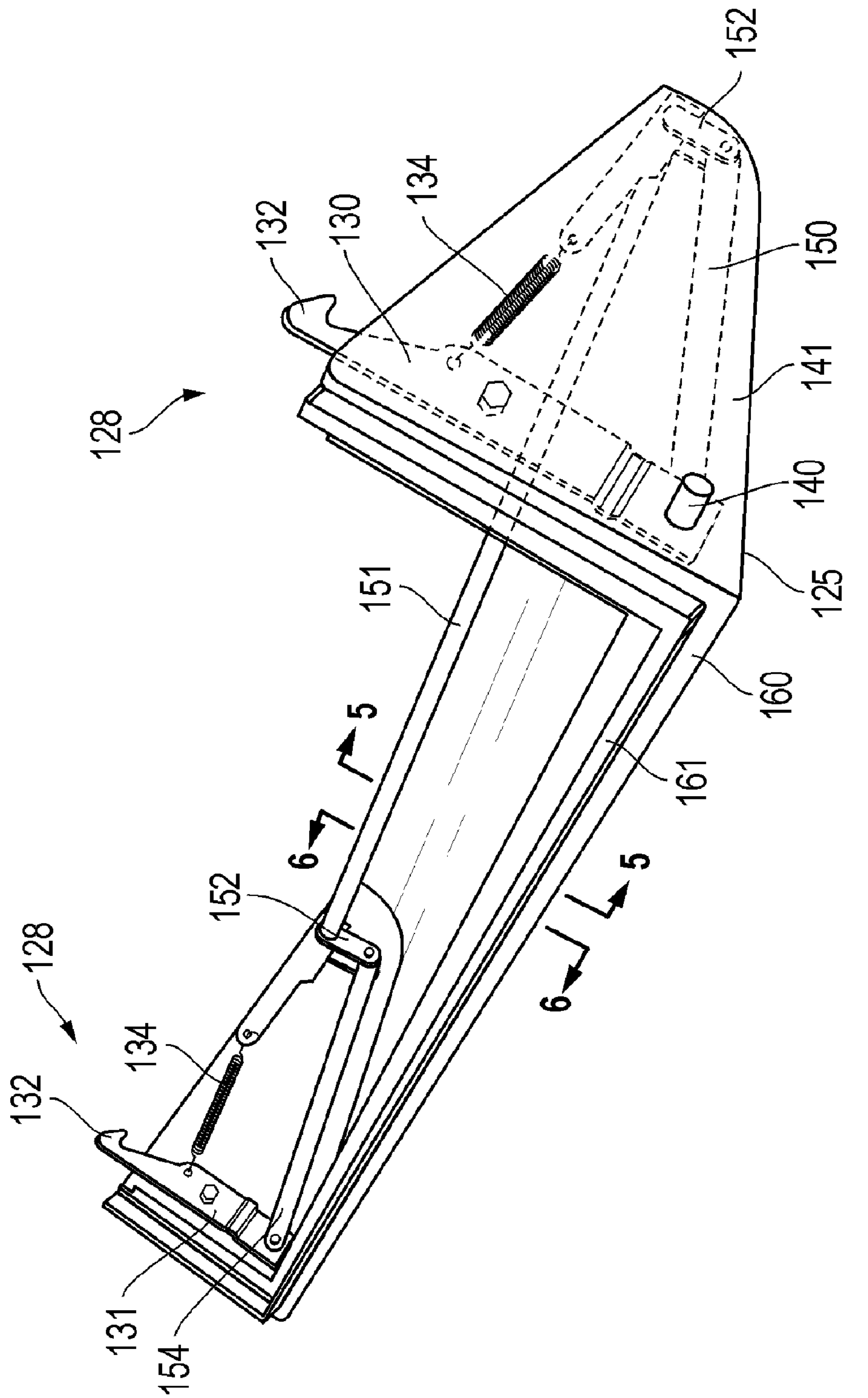
FIG. 4 is a view in perspective showing the lower door and latch mechanism.
Figure 5:
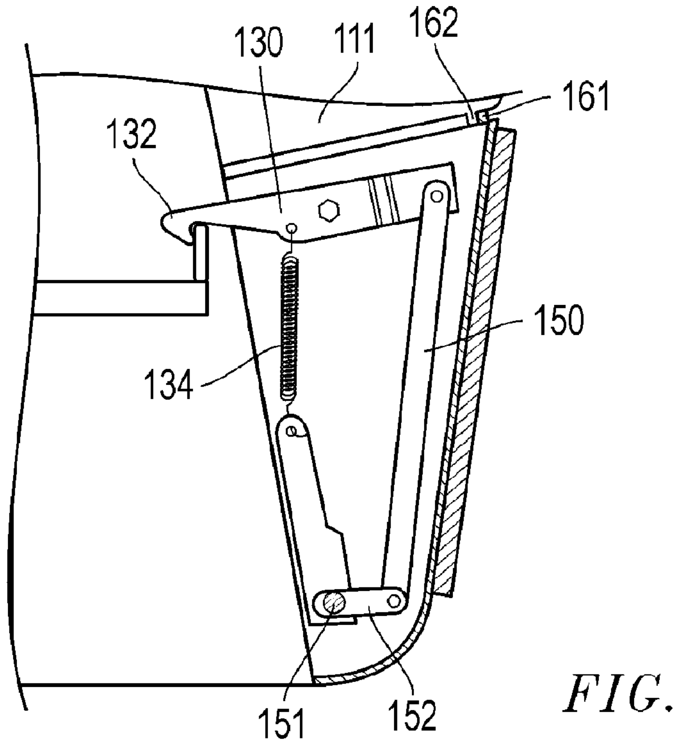
FIG. 5 is a partial section view taken along line 5-5 in FIG. 4 and showing a portion of the main door.
Figure 6:
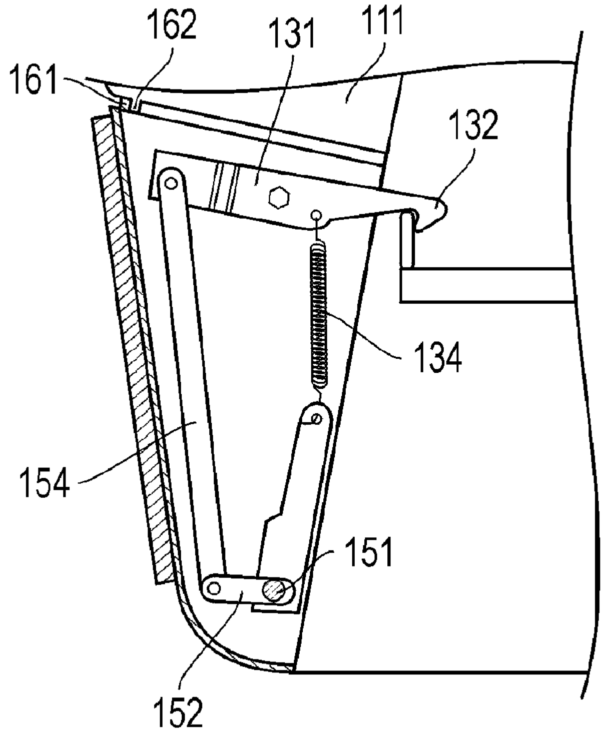
FIG. 6 is a partial section view taken along line 6-6 in FIG. 4 and showing a portion of the main door.

Referring to FIG. 4, a latch mechanism 128 associated with lower door 125 includes a right side latch member 130 and a left side latch member 131. Each latch member 130 and 131 has a respective hook shaped end 132 that is adapted to catch on a suitable structure within gaming machine 100 as shown in FIGS. 5 and 6. Latch members 130 and 131 are also each pivotally mounted on their respective side of the lower door 125. This pivot mounting allows the respective hook shaped end 132 of each latch member 130 and 131 to be raised so as to release the lower door 125 from the closed position shown in FIGS. 5 and 6. Each latch member 130 and 131 is associated with a respective biasing spring 134 to bias the respective hook shaped end 132 downwardly to the locking position shown in FIGS. 5 and 6.

Right side latch member 130 is connected to a knob 140 at the end opposite to the hook shaped end 132. A portion of knob 140 extends through an opening in a side 141 of lower door 125. Knob 140 extends sufficiently beyond side 141 to allow an operator to push the knob down and thereby pivot that end of right side latch member 130 downwardly and raise hook shaped end 132. This pivoting movement of right side latch member 130 is transmitted to left side latch member 131 through a right side linkage 150, a pivot linkage made up of a rod 151 and lever arms 152, and a left side linkage 154 which connects to the end of left side latch member 131 opposite hook shaped end 132.

The partial section views shown in FIGS. 5 and 6 illustrate how the lower door 125 captures main door 120. The top edge 160 of lower door 125 includes a capture feature 161. This capture feature is also shown in FIG. 4 and comprises a ridge of material that projects slightly above top edge 160. As shown in FIGS. 5 and 6, a similar ridge 162 projects from the bottom edge of main door 120. When both doors 120 and 125 are in the closed position, the upper end of lower door 125 and the lower end of main door 120 meet along a closure line that extends across the width of the cabinet immediately below the outwardly projecting button panel and armrest structure 111. In this closed position, ridge 162 protrudes downwardly and is engaged by capture feature 161. This engagement is produced when main door 120 is in the closed position and lower door 125 is then pivoted to the closed position shown in FIGS. 5 and 6. In this condition, main door 120 cannot be raised until lower door 125 is released using latch mechanism 128 and pivoted downwardly sufficiently to provide clearance for the main door to be pivoted upwardly.

As used herein the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised September 2007), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine including:

(a) a cabinet having a cabinet back, a first cabinet side, a second cabinet side, a cabinet bottom, and a cabinet top which together define an enclosure volume with a cabinet front opening;

(b) a main door pivotally connected at its upper end to the cabinet so as to be pivotable with respect to the cabinet between a closed position and an open position, the main door in the closed position covering the cabinet front opening in a main portion of the cabinet to define a front side of the main portion of the cabinet, the main door in the open position having its lower end pivoted upwardly and away from the cabinet to expose the enclosure volume in the main portion of the cabinet;

(c) a button panel structure mounted on the main door and forming a part thereof at the lower end of the main door, the button panel structure (i) extending in a plane lying at an angle to the remainder of the main door so as to project outwardly from the cabinet front opening when the main door is in the closed position, and (ii) having an inner edge that meets a plane defined by the remainder of the main door, the angle of the button panel structure to the remainder of the main door positioning a portion of the button panel structure forward of a front-most extent of the cabinet front opening; and (d) a lower door pivotally connected at its lower end to the cabinet so as to be pivotable with respect to the cabinet between a closed position and an open position, the lower door in the closed position covering the cabinet front opening in a lower portion of the cabinet to define a front side of the lower portion of the cabinet, the lower door in the open position having its upper end pivoted downwardly and away from the cabinet and the main door to expose the enclosure volume in the lower portion of the cabinet, (e) wherein the upper end of the lower door in the closed position and the lower end of the main door in the closed position meet along a closure line which extends across the width of the cabinet between the first cabinet side and the second cabinet side, the closure line being located immediately below the outwardly projecting button panel structure when the gaming machine is in an operating position.

2. The gaming machine of claim 1 wherein:

(a) the main door includes a first lateral side element that lies in a plane defined by the first cabinet side and abuts an upper portion of the cabinet front opening at the first cabinet side when the main door is in the closed position;

(b) the main door includes a second lateral side element that lies in a plane defined by the second cabinet side and abuts an upper portion of the cabinet front opening at the second cabinet side when the main door is in the closed position;

(c) the lower door includes a first lateral side element that lies in a plane defined by the first cabinet side and abuts a lower portion of the cabinet front opening at the first cabinet side when the lower door is in the closed position; and (d) the lower door includes a second lateral side element that lies in a plane defined by the second cabinet side and abuts a lower portion of the cabinet front opening at the second cabinet side when the lower door is in the closed position.

3. The gaming machine of claim 1 further including an armrest extending along a front edge of the button panel structure.

4. The gaming machine of claim 3 wherein the armrest projects outwardly from the remainder of the main door a distance that is approximately 38% of an overall depth dimension of the gaming machine comprising the shortest distance from the cabinet back to a front edge of the armrest.

5. The gaming machine of claim 3 further including a player input device mounted in the armrest.

6. The gaming machine of claim 1 further including a number of player input devices and wherein each player input device is mounted above the lower door.

7. The gaming machine of claim 1 wherein the main door defines a display area plane which is inclined rearwardly approximately 15 degrees with respect to vertical when the gaming machine is in the operating position and the main door is in the closed position.

8. A gaming machine including:

(a) a cabinet having a cabinet back, a first cabinet side, a second cabinet side, a cabinet bottom, and a cabinet top which together define an enclosure volume with a cabinet front opening;

(b) a main door pivotally connected at its upper end to the cabinet so as to be pivotable with respect to the cabinet between a closed position and an open position, the main door in the closed position covering the front opening in a main portion of the cabinet to define a front side of the main portion of the cabinet, the main door in the open position having its lower end pivoted upwardly and away from the cabinet to expose the enclosure volume in the main portion of the cabinet;

(c) a button panel and armrest structure mounted on the main door and forming a part thereof at the lower end of the main door, the button panel and armrest structure including a button panel which (i) extends in a plane lying at an angle to the remainder of the main door so as to project outwardly from the cabinet front opening when the main door is in the closed position, and which (ii) includes an inner edge that meets a plane defined by the remainder of the main door, the angle of the button panel to the remainder of the main door positioning a portion of the button panel forward of a front-most extent of the cabinet front opening; and (d) a lower door pivotally connected at its lower end to the cabinet so as to be pivotable with respect to the cabinet between a closed position and an open position, the lower door in the closed position covering the front opening in a lower portion of the cabinet to define a front side of the lower portion of the cabinet, the lower door in the open position having its upper end pivoted downwardly and away from the cabinet and the main door to expose the enclosure volume in the lower portion of the cabinet, (e) wherein, when the gaming machine is in an operating position, the main portion of the cabinet extends vertically from the upper edge of the main door to a base of the button panel to define a main portion height dimension, and the lower portion of the cabinet extends vertically from the cabinet bottom to the base of the button panel and armrest structure to define a lower portion height dimension, and wherein the lower portion height dimension is approximately 65% of the main portion height dimension.

9. The gaming machine of claim 8 wherein the button panel and armrest structure projects outwardly from the remainder of the main door a distance that is approximately 38% of an overall depth dimension of the gaming machine comprising the shortest distance from the cabinet back to a front edge of the button panel and armrest structure.

10. The gaming machine of claim 8 wherein the overall gaming machine depth dimension comprising the shortest distance from the cabinet back to a front edge of the button panel and armrest structure is approximately 75% of a gaming machine width dimension comprising the shortest distance from the first cabinet side to the second cabinet side.

11. The gaming machine of claim 8 wherein the main portion height dimension is approximately 83% to approximately 88% of a gaming machine width dimension comprising the shortest distance from the first cabinet side to the second cabinet side.

12. The gaming machine of claim 8 wherein the lower portion height dimension is approximately 54% to approximately 58% of a gaming machine width dimension comprising the shortest distance from the first cabinet side to the second cabinet side.

13. The gaming machine of claim 8 wherein:

(a) the main door includes a first lateral side element that lies in a plane defined by the first cabinet side and abuts an upper portion of the cabinet front opening at the first cabinet side when the main door is in the closed position;

(b) the main door includes a second lateral side element that lies in a plane defined by the second cabinet side and abuts an upper portion of the cabinet front opening at the second cabinet side when the main door is in the closed position;

(c) the lower door includes a first lateral side element that lies in a plane defined by the first cabinet side and abuts a lower portion of the cabinet front opening at the first cabinet side when the lower door is in the closed position; and (d) the lower door includes a second lateral side element that lies in a plane defined by the second cabinet side and abuts a lower portion of the cabinet front opening at the second cabinet side when the lower door is in the closed position.

* * * * *